United States Patent Office 3,370,913
Patented Feb. 27, 1968

3,370,913
SHRINKPROOFING WOOL WITH DIISOCYANATES
IN THE PRESENCE OF ETHYLENE CARBONATE
Nathan H. Koenig, Berkeley, Calif., assignor to the United
States of America as represented by the Secretary of
Agriculture
No Drawing. Filed Oct. 21, 1965, Ser. No. 500,434
3 Claims. (Cl. 8—128)

A non-exclusive, irrevocable, royalty-free license in the invention herein described, through out the world for all purposes of the United States Government, with the power to grant sublicenses for such purposes, is hereby granted to the Government of the United States of America.

The invention concerns and has as its prime object the provision of novel processes for shinkproofing wool. Further objects of the invention will be apparent from the following description wherein parts and percentages are by weight unless otherwise specified.

Although wool is a very useful fiber it is often desirable to improve its properties for particular applications by chemically modifying it. Various compounds have been proposed for reaction with wool to produce modified fibers. It is known, for example, that wool can be chemically modified by reacting it with mono- and di-isocyanates in the presence of any one of various promoters, namely, pyridine, dimethylformamide, dimethyl sulfoxide, etc. Although such procedures are useful in certain areas— e.g., for increasing the chemical resistance of wool— they are of little value in shrinkproofing wool because they do not result in effective shrinkproofing unless large amounts of the mono- or di-isocyanate are reacted with the wool.

I have found that when wool is reacted with a diisocyanate in the presence of ethylene carbonate effective shrinkproofing is attained with a low uptake of diisocyanate. The critical aspect of the invention lies in the presence (in the reaction system) of the compound ethylene carbonate, since it catalyzes the reaction of wool and diisocyanate in such direction as to provide the advantageous result of effective shrinkproofing at low uptake of diisocyanate.

It may be noted that ethylene carbonate has the structure

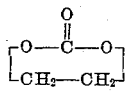

In a typical practice of the invention, a solution is prepared containing ethylene carbonate and a diisocyanate in an inert volatile diluent. This solution is distributed on the wool and heat is then applied. The diluent is evaporated at first, then the diisocyanate becomes fixed to the wool under the catalyst influence of the ethylene carbonate.

Dichloromethane is preferably used as the diluent. However, this is not a critical item as this substance primarily serves as a medium to facilitate uniform distribution of the active agents (ethylene carbonate and diisocyanate) on the wool. Other inert, low-boiling solvents can be used, for example, petroleum ether, cyclopentane, etc. Moreover, the treatment can be done in the absence of a diluent by applying to the wool a mixture of diisocyanate and ethylene carbonate in the form of a thin film or as a fine spray. Such manner of application reduces the amount of heat and time required to effect the reaction since there is no diluent to evaporate.

The process of the invention can also be carried out by serially applying to the wool the diisocyanate followed by the ethylene carbonate. Such serial application may be used to avoid reaction of diisocyanate with ethylene carbonate in a stored mixture prior to contact of the mixture and wool. As an example of serial application, the wool may be impregnated with a solution of diisocyanate in dichloromethane and passed through squeeze rolls to remove excess liquid. The wool is then impregnated with ethylene carbonate in dichloromethane and heated to evaporate the dichloromethane and effect the reaction.

The reaction conditions such as proportion of diisocyanate and ethylene carbonate, specific diisocyanate used, time, temperature, etc. are not critical and may be varied to suit individual circumstances without changing the basic nature of the invention. For example, the temperature of reaction may be from 50 to 130° C. The reaction rate is increased with increasing temperature and a preferred range to expedite the reaction, yet without damage to the wool, is about 110–120° C.

The time of reaction will vary depending on such factors as the amount of diluent, temperature of reaction, reactivity of the diisocyanate selected, and the degree of modification desired. In general, the reaction may take anywhere from a few minutes to a few hours.

Ordinarily, the reaction is applied to wool in its normal, undried condition (containing about 10–15% $H_2O$). However, the wool may be wet out with more water or partially dried before contacting it with the diisocyanate-ethylene carbonate mixture. Complete drying is not advisable since the desired results are not obtained with wool in an anhydrous condition.

The degree of modification of the wool is influenced by the proportion of diisocyanate taken up by the fiber; that is, the higher the uptake of diisocyanate the greater will be the degree of modification of the wool. In general, the uptake of diisocyanate may be varied from 1 to 50%. In most cases, it is desirable to adjust conditions to obtain the lowest uptake consistent with the desired degree of shrink resistance in order to take advantage of the fact that the softness of the hand of the treated fabric is generally closer to that of natural wool, and more desirable, the lower is the uptake of diisocyanate. By using optimum proportions of wool, moisture, diisocyanate, and ethylene carbonate, a high degree of shrinkproofing can be obtained at low uptakes. Taking these factors into account, it is generally preferred to limit the uptake of diisocyanate to about 1–10%.

Since the ethylene carbonate acts as a reaction promoter or catalyst, its proportion in the reaction system may be varied. In general, optimum results are attained where the amount of ethylene carbonate is about 10% to 50%, based on the weight of wool.

After reaction of the wool with the mixture of diisocyanate and ethylene carbonate, the treated wool is processed to remove excess diisocyanate, ethylene carbonate, diluent if present, and soluble reaction by-products. Thus, the wool may be processed by wringing, passage through squeeze rolls, centrifugation, or the like. In place of such mechanical action, or in addition thereto, the treated wool product may be extracted with a solvent such as trichloroethylene, toluene, acetone, butanone, ethanol, carbon tetrachloride, etc. Successive extractions with different solvents may be applied to ensure complete removal of all unreacted materials. The treated wool is then dried in the usual way.

Although the properties of the treated wool indicate that actual chemical combination of the wool with the diisocyanate has taken place, it is not known for certain how diisocyanate is united with the wool. It is believed, however, that the diisocyanate reacts with some of the sites on the wool molecule where there are reactive hydrogen atoms, e.g., amino, guanidino, and hydroxyl groups. Moreover, it is believed that in addition to reacting with the wool, the diisocyanate conjointly reacts with itself or with the moisture of the wool, or both. A polymer is thereby formed that is chemically bonded to the wool. The presence of more than one isocyanate group in the diisocyanate molecule permits it to react at two points to form polymer and also to chemically attach itself to wool. It may be, however, that other reactions occur and I do not intend to limit the invention to any theoretical basis.

Wool fibers treated in accordance with the invention can be used for all the usual purposes, e.g., for producing woven or knitted textiles, garments, etc. In fact, because of the improved shrink resistance, the fabricated products are of enhanced quality. An advantage of the process of the invention is that the improvement in properties is essentially permanent; the treated materials do not lose their new properties after long use or cleaning but retain these properties for the life of the material. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

Typical examples of diisocyanates which may be used in accordance with this invention are listed below by way of illustration but not limitation:

As the diisocyanate one may employ any of the aliphatic, aromatic, or aromatic-aliphatic compounds containing two isocyanate (—NCO) groups, preferably separated by at least two carbon atoms. The diisocyanates may be substituted if desired with non-interfering (non-functional) substituents such as ether groups, thioether groups, sulphone groups, halogen atoms, etc. Typical examples of compounds in this category are: Ethylene diisocyanate, propylene diisocyanate, butylene diisocyanate, trimethylene diisocyanate, tetramethylene diisocyanate, hexamethylene diisocyanate, octamethylene diisocyanate, decomethylene diisocyanate, cyclohexylene diisocyanate, bis(2 - isocyanatoethtyl) ether, bis(2 - isocyanatoethyl) ether of ethylene glycol, o-phenylene diisocyanate, m-phenylene diisocyanate, p-phenylene diisocyanate, tolylene-2,4-diisocyanate, tolylene-2,6-diisocyanate, 3,3' - bitolylene-4,4'-diisocyanate, diphenyl ether-4,4' - diisocyanate, diphenylmethane-4,4'-diisocyanate, 3,3'-dimethoxybiphenylene-4,4'-diisocyanate, naphthalene diisocyanates, polymethylene polyphenyl isocyanates, etc.

EXAMPLES

The invention is demonstrated by the following illustrative examples.

The wool used in the experiments set forth below was scoured, undyed wool flannel, 7 oz. per sq. yd. Prior to treatment, the wool was exhaustively extracted with ether, followed by ethanol, then conditioned at 65% relative humidity and 21° C. (standard conditions) to a moisture content of about 13%. The fabric was cut into circular samples for the treatments. In calculating uptakes, the dry weight of wool was calculated by a moisture factor and the treated sample was dried prior to weighing. All weight increases (uptakes) are given on a dry wool basis.

The shrinkage tests were conducted as follows: Measured fabric samples, including an untreated wool control, were violently agitated in an "Accelerotor" at 1700 r.p.m. for 6 minutes at 40–42° C. with 0.9% aqueous sodium oleate solution, using a liquor-to-wool ratio of 50 to 1. After this washing operation, the samples were remeasured to determine area shrinkage.

Example I

Wool fabric samples (1.4 g. each), tolylene-2,4-diisocyanate (0.10 ml.), ethylene carbonate (volumes as specified below), and dichloromethane (5 ml.) were placed individually in covered but unsealed Petri dishes. Each sample was placed in on oven at 120° C. for 15 minutes, during which time the dichloromethane vaporized and reaction with the residual diisocyanate occurred. The treated wool samples were successively extracted with warm acetone and hot ethanol to remove unreacted materials, then dried and weighed.

The results of the treatment and the shrinkage tests are tabulated below:

| Run | Ethylene carbonate, ml. | Increase in weight of wool, percent | Area shrinkage,[1] percent |
|---|---|---|---|
| a | None | 2 | 43 |
| b | 0.10 | 7 | 10 |
| c | 0.15 | 13 | 0 |
| d | 0.20 | 13 | 1 |

[1] The area shrinkage of a concurrently tested, untreated wool sample was 46%.

Example II

Wool fabric samples (1.4 g. each), tolylene-2,4-diisocyanate (0.05 ml.), ethylene carbonate (volumes as specified below), and dichloromethane (5 ml.) were put individually in covered, unsealed Petri dishes and held in an oven at 120° C. for 15 min. The treated wool samples were extracted as described in Example I, and dried.

The increases in weight and the area shrinkages are tabulated below:

| Run | Ethylene carbonate, ml. | Increase in weight of wool, percent | Area shrinkage,[1] percent |
|---|---|---|---|
| a | 0.10 | 7 | 15 |
| b | 0.15 | 8 | 7 |
| c | 0.20 | 7 | 0 |
| d | 0.25 | 8 | 1 |

[1] Area shrinkages of 46% and 49% were obtained for two untreated wool samples.

Having thus described the invention, what is claimed is:

1. A process for shrinkproofing wool which comprises reacting wool with an organic diisocyanate selected from the group consisting of aliphatic, aromatic, and aromatic-aliphatic diisocyanates, in the presence of ethylene carbonate.

2. The process of claim 1 wherein the diisocyanate is a tolylene diisocyanate.

3. The process of claim 1 wherein the diisocyanate is tolylene-2,4-diisocyanate.

References Cited

UNITED STATES PATENTS

| | | | |
|---|---|---|---|
| 2,974,003 | 3/1961 | Koenig | 8—128 |
| 3,007,763 | 11/1961 | Adans | 8—128 X |
| 3,112,157 | 11/1963 | Koenig | 8—128 |
| 3,145,074 | 8/1964 | Koenig | 8—127.6 |

NORMIN G. TORCHIN, *Primary Examiner.*

J. F. CANNON, *Assistant Examiner.*